United States Patent
Chen et al.

(10) Patent No.: US 8,412,974 B2
(45) Date of Patent: Apr. 2, 2013

(54) GLOBAL SYNCHRONIZATION OF PARALLEL PROCESSORS USING CLOCK PULSE WIDTH MODULATION

(75) Inventors: Dong Chen, Yorktown Heights, NY (US); Matthew R. Ellavsky, Rochester, MN (US); Ross L. Franke, Rochester, MN (US); Alan Gara, Yorktown Heights, NY (US); Thomas M. Gooding, Rochester, MN (US); Rudolf A. Haring, Yorktown Heights, NY (US); Mark J. Jeanson, Rochester, MN (US); Gerard V. Kopcsay, Yorktown Heights, NY (US); Thomas A. Liebsch, Sious Falls, SD (US); Daniel Littrell, Carmel, NY (US); Martin Ohmacht, Yorktown Heights, NY (US); Don D. Reed, Rochester, MN (US); Brandon E. Schenck, Rochester, MN (US); Richard A. Swetz, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 12/696,764

(22) Filed: Jan. 29, 2010

(65) Prior Publication Data

US 2011/0119475 A1    May 19, 2011

Related U.S. Application Data

(60) Provisional application No. 61/293,499, filed on Jan. 8, 2010.

(51) Int. Cl.
*G06F 1/04*     (2006.01)
*G06F 1/12*     (2006.01)
*G06F 15/16*    (2006.01)

(52) U.S. Cl. ........ 713/375; 713/400; 713/500; 713/501; 713/600

(58) Field of Classification Search .................. 713/375, 713/400, 500, 501, 600
See application file for complete search history.

(56) References Cited

U.S. PATENT DOCUMENTS

| | | | | |
|---|---|---|---|---|
| 5,045,715 A * | 9/1991 | Fitch | ............................. | 327/174 |
| 5,313,108 A * | 5/1994 | Lee et al. | ........................ | 327/161 |
| 5,661,731 A * | 8/1997 | Yip et al. | ........................ | 714/724 |
| 5,815,725 A * | 9/1998 | Feierbach | ..................... | 713/322 |
| 5,903,747 A * | 5/1999 | Casal | ............................. | 713/501 |
| 6,127,858 A * | 10/2000 | Stinson et al. | ................... | 327/99 |
| 6,466,074 B2 * | 10/2002 | Vakil et al. | ...................... | 327/295 |
| 6,480,966 B1 * | 11/2002 | Rawson, III | ................... | 713/400 |
| 6,804,793 B2 * | 10/2004 | Josephson et al. | ............. | 713/501 |
| 6,892,157 B2 * | 5/2005 | Slawecki et al. | .............. | 702/125 |
| 7,286,947 B1 | 10/2007 | Cranford, Jr. et al. | | |
| 7,991,101 B2 * | 8/2011 | Kocaman et al. | .............. | 375/359 |
| 7,991,933 B2 * | 8/2011 | Diaz et al. | ...................... | 710/261 |
| 2011/0219208 A1 * | 9/2011 | Asaad et al. | ..................... | 712/12 |

\* cited by examiner

*Primary Examiner* — Jaweed A Abbaszadeh
(74) *Attorney, Agent, or Firm* — Scully, Scott, Murphy & Presser, P.C.; Daniel P. Morris, Esq.

(57) ABSTRACT

A circuit generates a global clock signal with a pulse width modification to synchronize processors in a parallel computing system. The circuit may include a hardware module and a clock splitter. The hardware module may generate a clock signal and performs a pulse width modification on the clock signal. The pulse width modification changes a pulse width within a clock period in the clock signal. The clock splitter may distribute the pulse width modified clock signal to a plurality of processors in the parallel computing system.

21 Claims, 7 Drawing Sheets

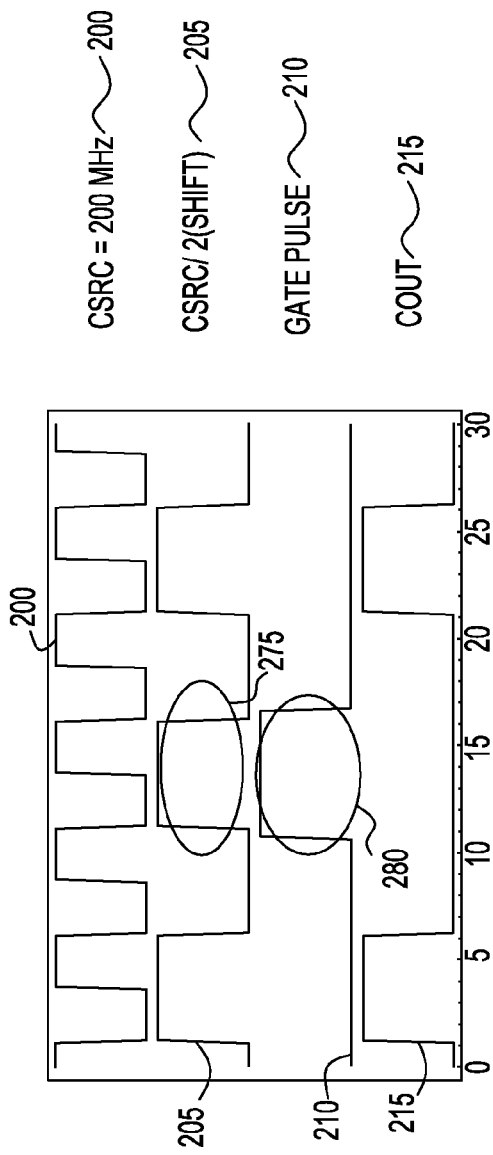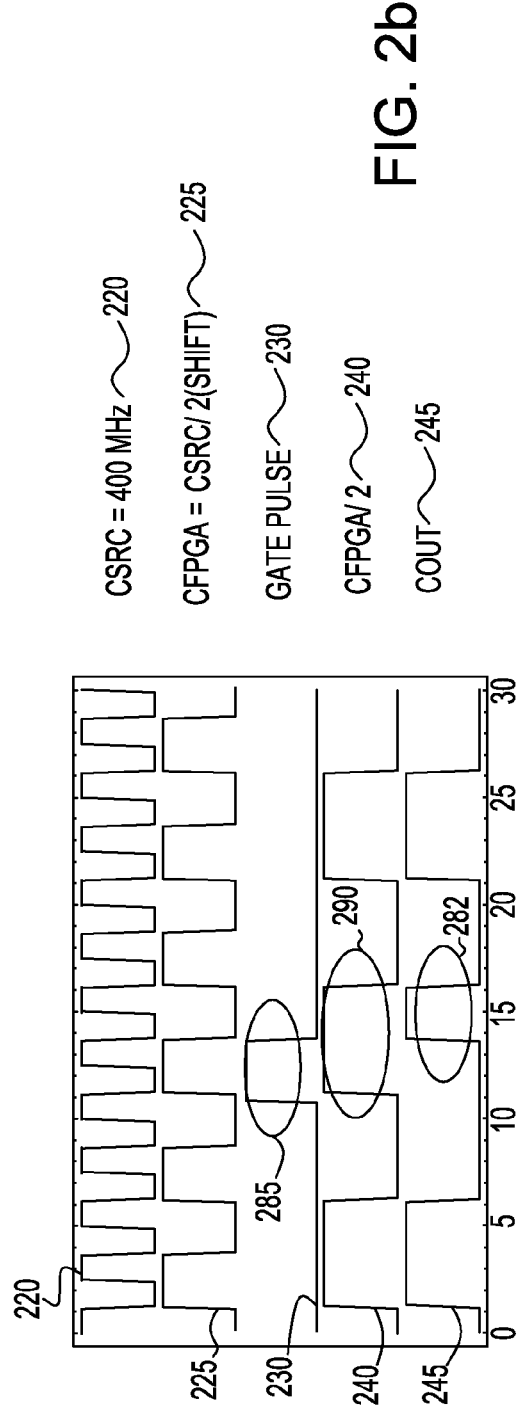

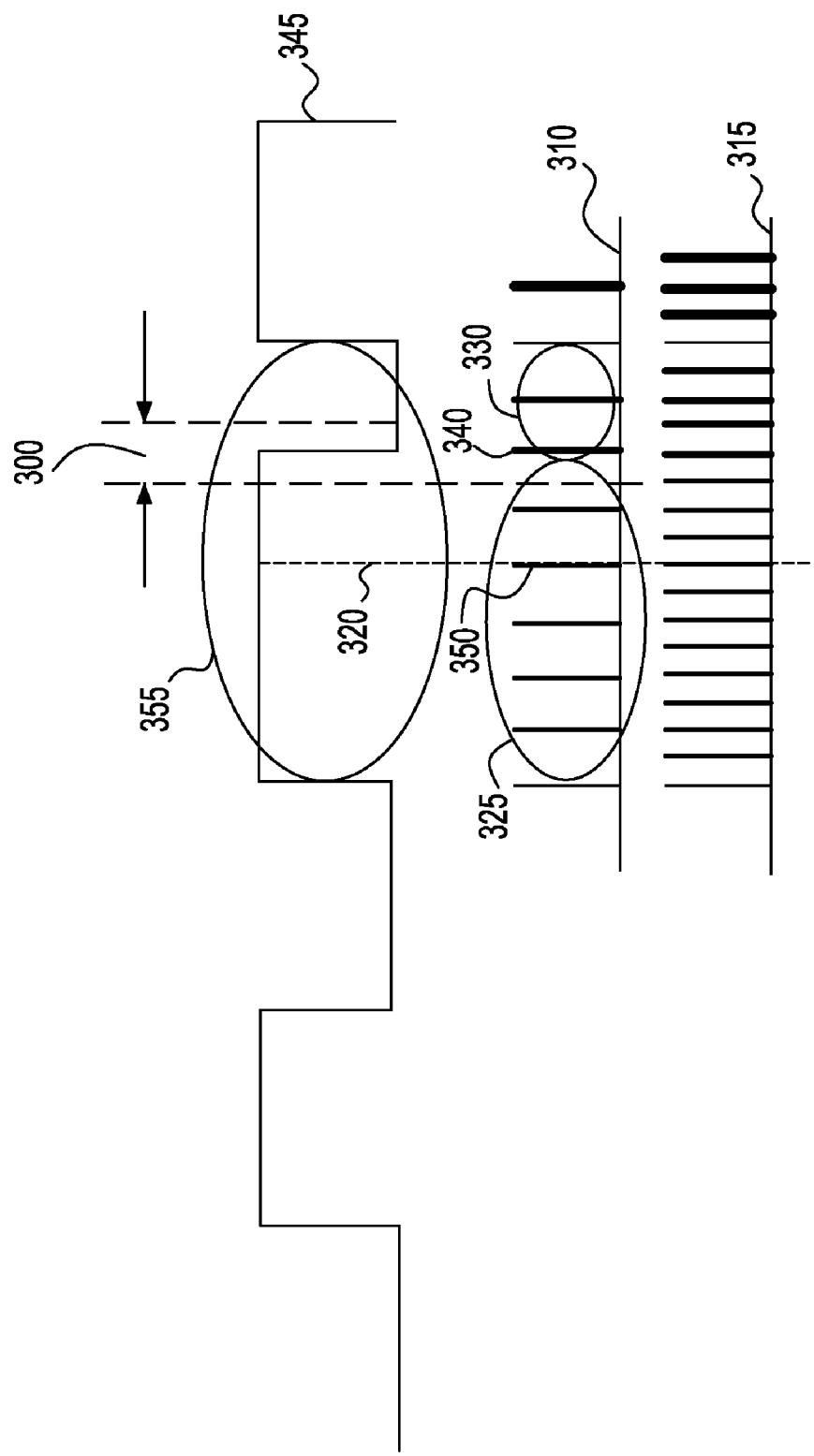

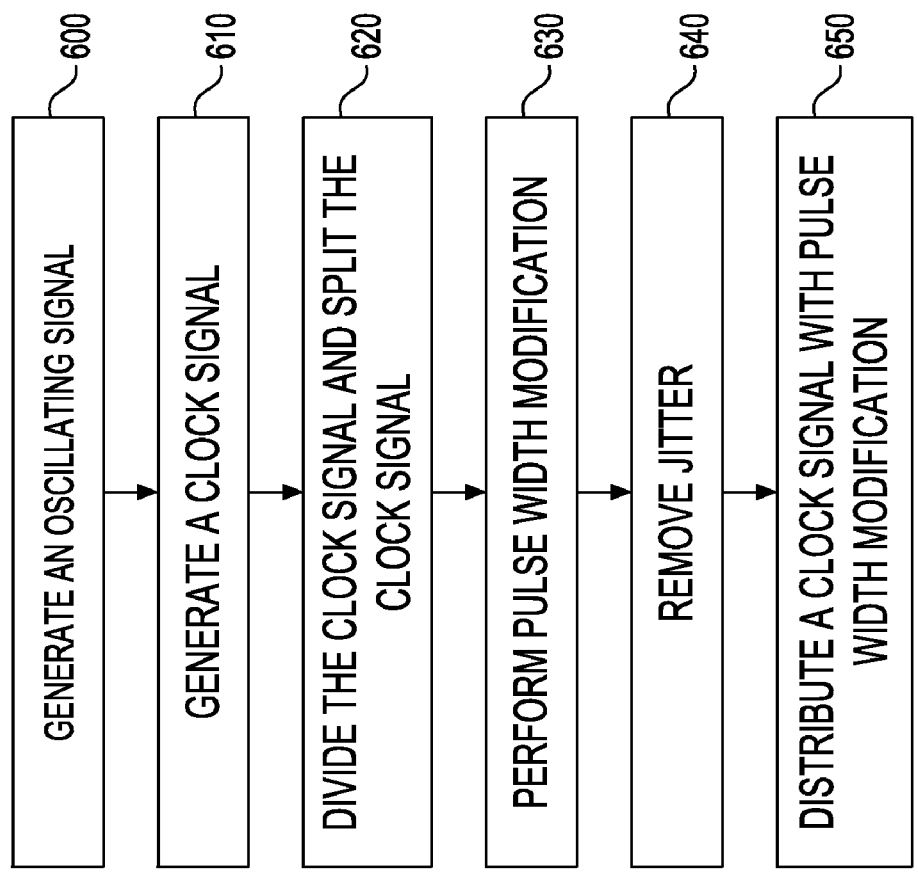

GLOBAL SYNCHRONIZATION OF PARALLEL PROCESSORS USING CLOCK PULSE WIDTH MODULATION

CROSS-REFERENCE TO RELATED APPLICATIONS

This application claims the benefit of U.S. patent application Ser. No. 61/293,499, filed Jan. 8, 2010 for "GLOBAL SYNCHRONIZATION OF PARALLEL PROCESSORS USING CLOCK PULSE WIDTH MODULATION"; U.S. Patent Application Ser. Nos. 61/261,269, filed Nov. 13, 2009 for "LOCAL ROLLBACK FOR FAULT-TOLERANCE IN PARALLEL COMPUTING SYSTEMS"; 61/293,611, filed Jan. 8, 2010 for "A MULTI-PETASCALE HIGHLY EFFICIENT PARALLEL SUPERCOMPUTER"; and 61/295,669, filed Jan. 15, 2010 for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT", the entire content and disclosure of each of which is incorporated herein by reference; and is related to the following commonly-owned, co-pending United States Patent Applications, the entire contents and disclosure of each of which is expressly incorporated by reference herein as if fully set forth herein: U.S. patent application Ser. No. 12/684,367, filed Jan. 8, 2010, for "USING DMA FOR COPYING PERFORMANCE COUNTER DATA TO MEMORY"; U.S. patent application Ser. No. 12/684,172, filed Jan. 8, 2010 for "HARDWARE SUPPORT FOR COLLECTING PERFORMANCE COUNTERS DIRECTLY TO MEMORY"; U.S. patent application Ser. No. 12/684,190, filed Jan. 8, 2010 for "HARDWARE ENABLED PERFORMANCE COUNTERS WITH SUPPORT FOR OPERATING SYSTEM CONTEXT SWITCHING"; U.S. patent application Ser. No. 12/684,496, filed Jan. 8, 2010 for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, for "HARDWARE SUPPORT FOR SOFTWARE CONTROLLED FAST MULTIPLEXING OF PERFORMANCE COUNTERS"; U.S. patent application Ser. No. 12/697,799, filed Feb. 1, 2010, for "CONDITIONAL LOAD AND STORE IN A SHARED CACHE"; U.S. patent application Ser. No. 12/684,738, filed Jan. 8, 2010, for "DISTRIBUTED PERFORMANCE COUNTERS"; U.S. patent application Ser. No. 12/684,860, filed Jan. 8, 2010, for "PAUSE PROCESSOR HARDWARE THREAD ON PIN"; U.S. patent application Ser. No. 12/684,174, filed Jan. 8, 2010, for "PRECAST THERMAL INTERFACE ADHESIVE FOR EASY AND REPEATED, SEPARATION AND REMATING"; U.S. patent application Ser. No. 12/684,184, filed Jan. 8, 2010, for "ZONE ROUTING IN A TORUS NETWORK"; U.S. patent application Ser. No. 12/684,852, filed Jan. 8, 2010, for "PROCESSOR RESUME UNIT"; U.S. patent application Ser. No. 12/684,642, filed Jan. 8, 2010, for "TLB EXCLUSION RANGE"; U.S. patent application Ser. No. 12/684,804, filed Jan. 8, 2010, for "DISTRIBUTED TRACE USING CENTRAL PERFORMANCE COUNTER MEMORY"; U.S. patent application Ser. No. 61/293,237, filed Jan. 8, 2010, for "ORDERING OF GUARDED AND UNGUARDED STORES FOR NO-SYNC I/O"; U.S. patent application Ser. No. 12/693,972, filed Jan. 26, 2010, for "DISTRIBUTED PARALLEL MESSAGING FOR MULTIPROCESSOR SYSTEMS"; U.S. patent application Ser. No. 12/688,747, filed Jan. 15, 2010, for "Support for non-locking parallel reception of packets belonging to the same reception FIFO"; U.S. patent application Ser. No. 12/688,773, filed Jan. 15, 2010, for "OPCODE COUNTING FOR PERFORMANCE MEASUREMENT"; U.S. patent application Ser. No. 12/684,776, filed Jan. 8, 2010, for "MULTI-INPUT AND BINARY REPRODUCIBLE, HIGH BANDWIDTH FLOATING POINT ADDER IN A COLLECTIVE NETWORK"; U.S. patent application Ser. No. 12/984,252, filed Jan. 4, 2011, for"CACHE WITHIN A CACHE"; U.S. patent application Ser. No. 61/299,911, filed Jan. 29,2010, for"SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 13/008,583, filed Jan. 18, 2011, for"READER SET ENCODING FOR DIRECTORY OF SHARED CACHE MEMORY IN MULTIPROCESSOR SYSTEM"; U.S. patent application Ser. No. 12/984,308, filed Jan. 4, 2011, for "EVICT ON WRITE, A MANAGEMENT STRATEGY FOR A PREFETCH UNIT AND/OR FIRST LEVEL CACHE IN A MULTIPROCESSOR SYSTEM WITHIN SPECULATIVE EXECUTION"; U.S. patent application Ser. No. 12/984,329, filed Jan. 4, 2011, for "PHYSICAL ALIASING FOR THREAD LEVEL SPECULATION WITHIN A SPECULATION BLIND CACHE"; U.S. patent application Ser. No. 61/293,552, filed Jan. 8, 2010, for "LIST BASED PREFETCH"; U.S. patent application Ser. No. 12/684,693, filed Jan. 8, 2010, for "PROGRAMMABLE STREAM PREFETCH WITH RESOURCE OPTIMIZATION"; U.S. patent application Ser. No. 61/293,494, filed Jan. 8, 2010, for "NON-VOLATILE MEMORY FOR CHECKPOINT STORAGE"; U.S. patent application Ser. No. 61/293,476, filed Jan. 8, 2010, for "NETWORK SUPPORT FOR SYSTEM INITIATED CHECKPOINTS"; U.S. patent application Ser. No. 61/293,554, filed Jan. 8, 2010, for "TWO DIFFERENT PREFETCHING COMPLEMENTARY ENGINES OPERATING SIMULTANEOUSLY"; U.S. patent application Ser. No. 12/697,015, filed Jan. 29, 2010, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, filed Jan. 8, 2010, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 61/293,569, filed Jan. 8, 2010, for "IMPROVING THE EFFICIENCY OF STATIC CORE TURNOFF IN A SYSTEM-ON-A-CHIP WITH VARIATION"; U.S. patent application Ser. No. 12/697,043, filed Jan. 29, 2011 for "IMPLEMENTING ASYNCHRONOUS COLLECTIVE OPERATIONS IN A MULTI-NODE PROCESSING SYSTEM"; U.S. patent application Ser. No. 13/008,546, filed Jan. 18, 2011, for "ATOMICITY: A MULTI-PRONGED APPROACH"; U.S. patent application Ser. No. 12/697,175, filed Jan. 29, 2010, for "I/O ROUTING IN A MULTIDIMENSIONAL TORUS NETWORK"; U.S. patent application Ser. No. 12/684,287, filed Jan. 8, 2010 for "ARBITRATION IN CROSSBAR INTERCONNECT FOR LOW LATENCY"; U.S. patent application Ser. No. 12/684,630, filed Jan. 8, 2010 for "EAGER PROTOCOL ON A CACHE PIPELINE DATAFLOW"; U.S. patent application Ser. No. 12/723,277 for "EMBEDDING GLOBAL BARRIER AND COLLECTIVE IN A TORUS NETWORK"; U.S. patent application Ser. No. 61/293,266, filed Jan. 8, 2010 for "IMPLEMENTATION OF MSYNC"; U.S. patent application Ser. No. 12/796,389, filed Jun. 8, 2010, for "BALANCING WORKLOAD IN A MULTIPROCESSOR SYSTEM RESPONSIVE TO PROGRAMMABLE ADJUSTMENTS IN SYNCRONIZATION INSTRUCTION"; U.S. patent application Ser. No. 12/696,817, filed Jan. 29, 2010, for "HEAP/STACK GUARD PAGES USING A WAKEUP UNIT"; U.S. patent application Ser. No. 61/293,603, filed Jan. 8, 2010 for "MECHANISM OF SUPPORTING SUB-COMMUNICATOR COLLECTIVES WITH O(64) COUNTERS AS OPPOSED TO ONE COUNTER FOR EACH SUB-COMMUNICATOR"; and U.S. patent application Ser. No. 61/299,918, filed Jan. 29, 2010, for "REPRODUCIBILITY IN A MULTIPROCESSOR SYSTEM".

STATEMENT OF GOVERNMENT RIGHTS

This invention was made with Government support under Contract No. B554331 awarded by the Department of Energy. The Government has certain rights in the invention.

BACKGROUND

The present application generally relates to a parallel computing system. More particularly, the present application relates to synchronizing processors in the parallel computing system.

A parallel computing system includes a plurality of processors that can concurrently operate. These processors may cooperate together to perform a certain operation, e.g., an arithmetic operation. To work together, processors in the parallel computing system can be synchronized according to a global clock signal.

Modern processing systems have clock frequencies in a multi-GHz range. This results in communications paths between processors necessarily involving multiple clock cycles. Additionally, the clock frequencies in modern multiprocessor systems are not all exactly equal, as they are typically derived from multiple local oscillators that are each directly used by only a small fraction of the processors in the multiprocessor systems. Having all processors utilize the same clock may require that all modules in the system receive a single global clock signal, thereby requiring a global clock network. Both the lack of a global clock signal and the complexities of synchronization of chips when communication distances between chips are many cycles may result in an inability of modern systems to exactly synchronize.

SUMMARY OF THE INVENTION

The present disclosure describes a system, method and computer program product for synchronizing a plurality of processors in a parallel computing system.

This disclosure describes a method, a system and a computer program product by which a global clock network can be enhanced along with innovative circuits inside receiving devices to enable global clock synchronization. By achieving the global clock synchronization, the multiprocessor system may enable exact reproducibility of processing of instructions. Thus, this global clock synchronization may assist to accurately reproduce processing results in a system-wide debugging mechanism.

This disclosure describes a method, a system and a computer program product to generate and detect a global synchronization signal using a pulse width modulation of one or more selected clock cycles of a global clock signal. This synchronization signal may provide a relative time or phase reference to each processor that is consistent between processors and with more precise timing than can be achieved by traditional techniques using a network communication. In one aspect, both sending and receiving of this global synchronization signal using the pulse width modification are used for accurate system synchronization. On the receiving, there may be provided a high frequency phase locked loop or delay locked loop to generate these high frequencies from a much lower input oscillator frequency. The disclosure further describes how one can identify a unique cycle with a pulse width modification in high frequency domains while also having all lower frequency domains whose phases are aligned in all chips in the system.

In one embodiment, there may be provided a method for synchronizing a plurality of processors in a parallel computing system, the method comprising:
generating a clock signal;
performing a pulse width modification on the clock signal, the pulse width modification changing a pulse width within a clock period in the clock signal;
distributing the pulse width modified clock signal to a plurality of processors in the parallel computing system to synchronize the processors.

In one embodiment, there may be provided an apparatus for synchronizing a plurality of processors in a parallel computing system, the apparatus comprising:
a hardware module for generating a clock signal and for performing a pulse width modification on the clock signal, the pulse width Modification changing a pulse width within a clock period in the clock signal;
a clock splitter for distributing the pulse width modified clock signal to a plurality of processors in the parallel computing system to synchronize the processors.

In a further embodiment, the apparatus further comprises a flip flop for removing a jitter in the pulse width modified clock signal.

In a further embodiment, the pulse width modification comprises one or more of:
removing a pulse within the clock period in the clock signal;
narrowing a pulse width within the clock period in the clock signal; and
widening a pulse width within the clock period in the clock signal.

In a further embodiment, the apparatus includes a plurality of flip flops for oversampling the pulse width modified clock signal.

In a further embodiment, the apparatus includes a counter device for dividing a clock frequency of the clock signal.

BRIEF DESCRIPTION OF THE DRAWINGS

The accompanying drawings are included to provide a further understanding of the present invention, and are incorporated in and constitute a part of this specification.

FIGS. 2a-2c illustrate pulse width modified clock signals in one embodiment.

FIG. 3 illustrates oversampling a pulse width modified clock signal in one embodiment.

FIG. 6 illustrates a flow chart for generating a pulse width modified clock signal in one embodiment.

DETAILED DESCRIPTION

This disclosure describes a method, system and a computer program product to generate and/or detect a global clock signal having a pulse width modification in one or more selected clock period(s). In the present disclosure, a global clock signal can be used as an absolute phase reference signal (i.e., a reference signal for a phase correction of a clock signal) as well as a clock signal to synchronize processors in the parallel computing system. A global clock signal can be used for a synchronized system with a resetting capability, network synchronization, pacing of parallel calculations and power management in a parallel computing system. This disclosure describes a clock signal with modulated clock pulse width used for a global synchronization signal. This disclosure also describes a method, system and a computer program product for generating a global synchronization signal (e.g., a signal 545 in FIG. 4) based on the global clock signal with the pulse width modification. A global synchronization signal refers to a signal that can be used to notify a plurality of processors to synchronize, for example, to perform instructions, operations and others. In other words, the global synchronization signal can cause an interrupt signal to one or more of processors in a parallel computing system. A pulse width modulation refers to a technique for modifying one or more clock pulses in a clock signal. The parallel computer system may derive their processor clocks from the global clock signal having the pulse width modification. This disclosure also describes how a single clock signal can be used to enable processor synchronization in a parallel computing system.

Figure 1:
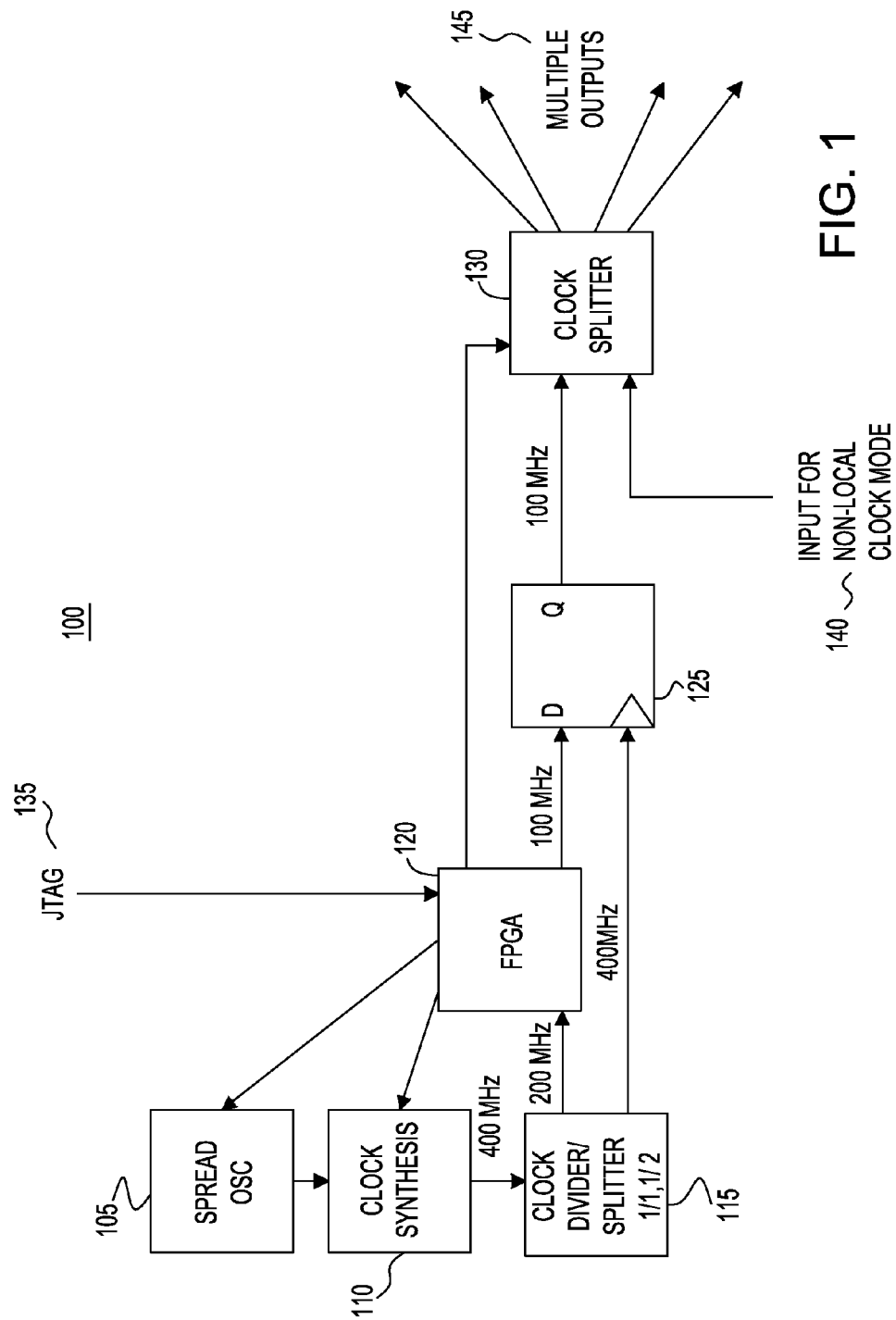
FIG. 1 illustrates a system diagram of a clock generation circuit in one embodiment.

FIG. 1 illustrates a system diagram for generating a global clock signal in which one or more clock pulse(s) has been modified in one embodiment. In FIG. 1, a clock generation circuit 100 generates a global clock signal with pulse modification(s). The clock generation circuit 100 includes, but is not limited to: an oscillator 105, a clock synthesizer 110, a clock divider and splitter 115, a hardware module 120, a flip flop 125 and a clock splitter 130. FIG. 6 illustrates a flow chart describing method steps that clock generation circuit 100 operates. For clarity of explanation, the functional components of FIG. 1 are described with reference to method steps in FIG. 6. At step 600 in FIG. 6, an oscillator (e.g., an oscillator 105 in FIG. 1, a spread-spectrum VSS4 oscillator from Vectron™ International, Inc., and/or others) generates a stable fixed frequency signal (e.g., 25 MHz oscillating signal). At step 610 in FIG. 6, a clock synthesizer (e.g., a clock synthesizer 110 in FIG. 1, a CDCE62005 from Texas Instruments® Incorporated, hereinafter "TI", and/or others) generates a first clock signal based on the stable fixed frequency signal. For example, if the oscillator 105 generates a 25 MHz oscillating signal, the clock synthesizer 110 produces 400 MHz clock signal, e.g., by multiplying the 25 MHz oscillating signal. CDCE949 and CDCEL949 from TI are commercial products that perform clock signal synthesis (i.e., clock signal generation), clock signal multiplication (e.g., generating a 400 MHz clock signal from a 100 MHz clock signal), and clock signal division (e.g., generating a 200 MHz clock signal from a 400 MHz clock signal).

At step 620 in FIG. 6, a clock divider/splitter (e.g., clock divider and splitter 115 in FIG. 1, CDCE949 and CDCEL949 from TI, and/or others) divides a clock frequency of the first clock signal to generate a second clock signal, e.g., by dividing by "N", and splits the first clock signal and the second clock signal. Vakil, et al., "Low skew minimized clock splitter," U.S. Pat. No. 6,466,074, wholly incorporated by reference as if set forth herein, describes a clock splitter in detail. For example, as shown in FIG. 1, the clock divider and splitter 115 receives a 400 MHz first clock signal from the clock synthesizer 110 and outputs a 200 MHz second clock signal to a hardware module (e.g., an FPGA (Field Programmable Gate Array) or CPLD (Complex Programmable Logic Device) 120 in FIG. 1) and outputs the 400 MHz first clock signal to a flip flop (e.g., D flip flop 125 in FIG. 1).

At step 630 in FIG. 6, the hardware module 120 divides a clock frequency of the second clock signal to generate a third clock signal and performs a pulse width modulation on the third clock signal. The pulse width modulation changes a pulse width within a clock period in the third clock signal. In one embodiment, the hardware module is reconfigurable, i.e., the hardware module can be modified or updated by loading different code.

In one embodiment, a user configures the hardware module, e.g., through a hardware console (e.g., JTAG) by loading code written by a hardware description language (e.g., VHDL, Verilog, etc.). The hardware module 120 may include, but is not limited to: a logical exclusive OR gate for narrowing a pulse width within a clock period in the third clock signal, a logical OR gate for widening a pulse width within a clock period in the third clock signal, and/or another logical exclusive OR gate for removing a pulse within a clock period within the second clock signal. The hardware module 120 may also include a counter device to divide clock signal frequency and to determine a specific clock cycle to perform a pulse width modification.

FIG. 2a illustrates an example of removing a pulse within a clock period in a clock signal. In this example, the clock divider and splitter 115 receives a 200 MHz first clock signal (200) from the clock synthesizer 110 and outputs a 100 MHz second clock signal (205) to the hardware module 120. The hardware module 120 generates a pulse (210), e.g., by counting the number of rising edges in the 100 MHz second clock signal (205) and generating a pulse when the counting reaches a certain number (e.g., a determined number two). The pulse shown at 210, also referred to as a gate pulse is used to determine which clock period in the 100 MHz second clock signal (205) is going to be modified. In this example, there is a pulse (210) at a location (280) corresponding to the second pulse (275) in the 100 MHz second clock signal (205). The location (280) of this pulse (210) corresponds to the second pulse (275) in the 100 MHz second clock signal (205). Thus, it is determined that the second pulse (275) is to be modified as shown at FIG. 2a. To remove the second pulse in the 100 MHz second clock signal (205), the hardware module 120 performs a logical exclusive OR operation between the 100 MHz second clock signal (205) and the pulse (210) and generates a pulse width modified clock signal (215).

FIG. 2b illustrates an example of narrowing a pulse width within a clock period in the third clock signal. In this example, the clock divider and splitter 115 receives a 400 MHZ first clock signal (220) from the clock synthesizer 110 and outputs a 200 MHz second clock signal (225) to the hardware module 120. The hardware module 120 generates a pulse (230), e.g., by counting the number of rising edges in the 200 MHz second clock signal (225) and generating a pulse when the counting reaches a certain number (e.g., a determined number 2). The hardware module 120 also divides the clock frequency of the 200 MHz second clock signal (225) to generate a 100 MHz third clock signal (240). The pulse shown at 230, also referred to as a gate pulse, is used to determine which clock period in the 100 MHz third clock signal (240) is going to be modified. In this example, there is a pulse (230) at a location (285) corresponding to the second pulse (290) in the 100 MHz third clock signal (240). The location (285) of this pulse (230) corresponds to the second pulse (290) in the 100 MHz third clock signal (240). Thus, it is determined that the second pulse (290) is to be modified as shown at FIG. 2b. To narrow the second pulse in the 100 MHz third clock signal (240), the hardware module 120 performs a logical exclusive OR operation between the 100 MHz third clock signal (240) and the pulse (230) and generates a pulse width modified clock signal (245).

To widen a clock pulse in a clock signal, after generating the pulse (230), the hardware module 120 may shift the pulse (230), e.g., shift left or right the pulse (230) by a fraction of a clock cycle such as a quarter or half cycle of the 100 MHz third clock signal (240) and perform a logical OR operation between the shifted pulse and the 100 MHz third clock signal (240) to generate a pulse width modified clock signal.

Figure 2C:
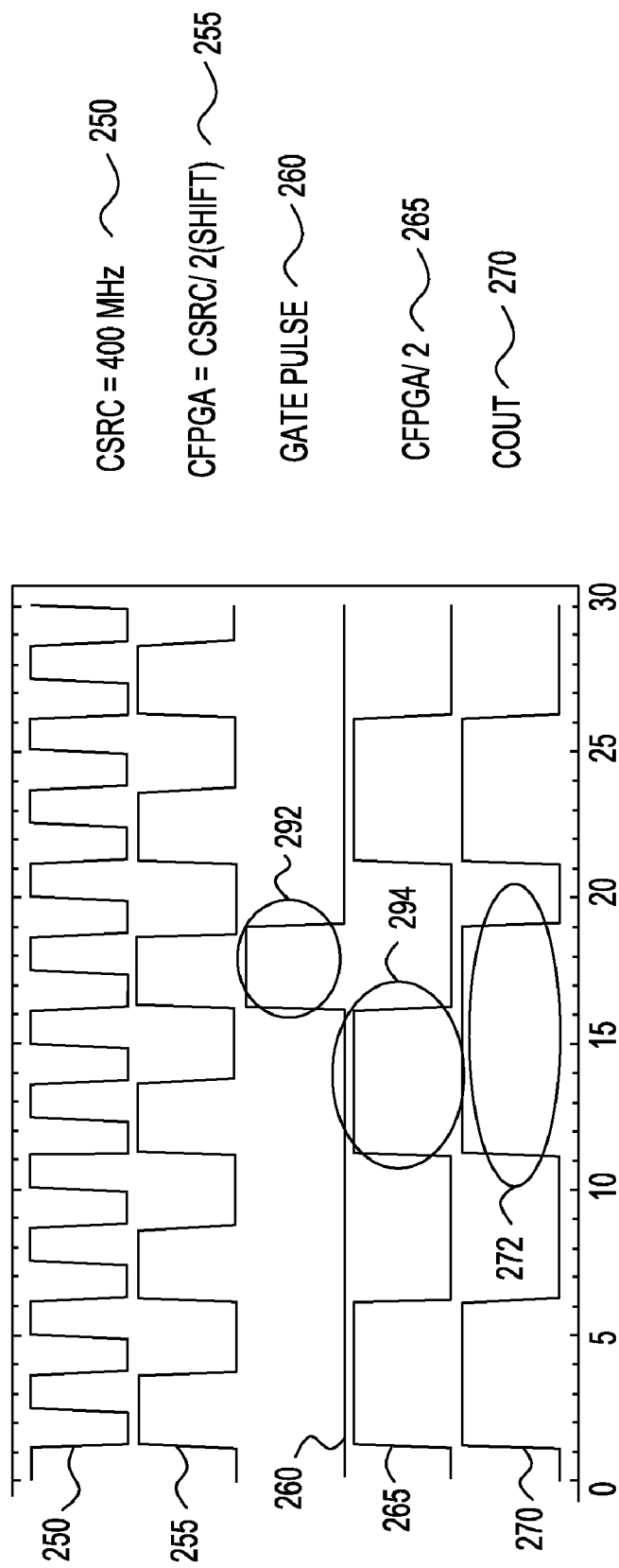

FIG. 2c illustrates an example of widening a pulse width within a clock period in the third clock signal. In this example, the clock divider and splitter 115 receives a 400 MHZ, first clock signal (250) from the clock synthesizer 110 and outputs a 200 MHz second clock signal (255) to the hardware module 120. The hardware module 120 generates a pulse (260), e.g., by counting the number of rising edges in the 200 MHz second clock signal (255) and generating a pulse when the counting reaches a certain number (e.g., a determined number 2). The hardware module 120 also divides the clock frequency of the 200 MHz second clock signal (255) to generate a 100 MHz third clock signal (265). The pulse shown at 260, also referred to as a gate pulse, is used to determine which clock period in the 100 MHz third clock signal (265) is going to be modified. In this example, there is a pulse (260) at a location (292) corresponding to the second pulse (294) in the 100 MHz third clock signal (265). The location (292) of this pulse (260) corresponds to the second pulse (294) in the 100 MHz third clock signal (265). Thus, it is determined that the second pulse (294) is to be modified as shown at FIG. 2c. To widen the second pulse in the 100 MHz third clock signal (265), the hardware module 120 performs a logical OR operation between the 100 MHz third clock signal (265) and the pulse (260) and generates a pulse width modified clock signal (270).

Referring again to FIG. 6, at step 640, a flip flop (e.g., a D flip flop 125 in FIG. 1) receives a pulse width modified clock signal (e.g., a signal 215 or signal 245 in FIGS. 2a-2b) and filters the pulse width modified clock signal, e.g., by removing jitters in the pulse width modified clock signal. At step 650, a clock splitter (e.g., a clock splitter 130 in FIG. 1) receives the filtered clock signal from the flip flop 125, an optional external clock signal from other sources 140, and a selection signal for selecting the filtered clock signal or the external clock signal from the hardware module 120. Then, the clock splitter outputs a selected signal (i.e., the filtered clock signal or the external clock signal) to a plurality of processors in a parallel computing system. The output signals 145 from the clock splitter may have a same clock frequency, same phase and/or a same pulse width modification (i.e., having a same modification on a same pulse). It is noted that the external clock signal from another source 140 need not be present. In that case, there is no need for a select to the clock splitter 130. In one embodiment, the output signal 145 (e.g., a pulse width modified clock signal) may reset the parallel computing system and/or a plurality of processors in the system as described below.

There may be diverse methods to modify clock pulse width. In one embodiment, a clock generation circuit (e.g., the circuit 100 shown in FIG. 1) may receive a clock signal, e.g., a from a clock synthesizer 110, and generate a pulse width modified clock signal, e.g., by using a counter device and a logic gate. By manipulating the value of the counter device, the clock generation circuit may generate the pulse width modified clock signal, e.g., every quarter clock cycle. In one embodiment, the hardware module 120 divides a clock frequency of a clock signal (e.g., 400 MHz clock signal), e.g., by using a counter device for counting clock edges of the clock signal, extends or reduces a clock pulse width within a clock period of the frequency-divided clock signal (e.g., 100 MHz clock signal) and thus changes the clock period from 50% duty cycle to 75% duty cycle or 50% duty cycle to 25% duty cycle. In one embodiment, a clock period of a clock signal can have a pulse width modification which modifies a quarter clock period of the clock signal. Modifications by different clock periods and/or different clock duty cycles are possible and the present invention does not limit the modification to a specific amount.

For example, if the hardware module 120 includes a decrementing counter device and an logical OR gate, by decrementing a value of the counter device from 3 to 0 every falling edge of the first clock signal 250 (e.g., 400 MHz clock signal), the hardware module 120 generates a second clock signal 255 (e.g., 200 MHz clock signal) and a third clock signal 265 (e.g., 100 MHz clock signal) as shown in FIG. 2c. The hardware module 120 generates the second clock signal 255 whose clock frequency is 1/N of a clock frequency of the first clock signal 250 where "N" is a positive integer number, e.g., by maintaining a high ("1") value when the value of the counter device is three and maintaining a low ("0") value when the value of the counter device is two, and so on. The hardware module 120 generates a third clock signal 265 whose clock frequency is 1/M of a clock frequency of the first clock signal 250 where "M" is a positive integer number e.g., by maintaining a high ("1") value when the value of the counter device is three or two and maintaining a low ("0") value when the value of the counter device is one or zero. The hardware module 120 generates a gate pulse 260, for example, when the value of the counter device is 1, i.e., at the location 292. Similarly, if the hardware module 120 includes an incrementing counter device and a logical OR gate, by incrementing a value of the counter device from 0 to 3 every rising edge of the first clock signal 250, the hardware module 120 generates a second clock signal 255 and a third clock signal 265. By performing a logical OR operation between the second clock signal 255 and the third clock signal 265, the hardware module 120 generates a pulse width modified clock pulse 272 which widens a clock pulse width of a third clock signal 265.

Referring to FIG. 2b, if the hardware module 120 includes a decrementing counter device and a logical exclusive OR gate, the value of the counter device is decremented from 3 to 0 every falling edge of the first clock signal 220, and the hardware module 120 generates a second clock signal 225 and a third clock signal 240 based on the decremented value. For example, the hardware module 120 generates the second signal 255 whose clock frequency is 1/N of a clock frequency of the first clock signal 220 where "N" is a positive integer number, e.g., by maintaining a high ("1") value when the value of the counter device is three and maintaining a low ("0") value when the value of the counter device is two, and so on. The hardware module 120 generates a third clock signal

240 whose clock frequency is 1/M of a clock frequency of the first clock signal 220 where "M" is a positive integer number, e.g., by maintaining a high ("1") value when the value of the counter device is three or two and maintaining a low ("0") value when the value of the counter device is one or zero. The hardware module 120 generates a gate pulse 230, for example, when the value of the counter device is three, i.e., at the location 285. Similarly, if the hardware module 120 includes an incrementing counter device and a logical exclusive OR gate, the value of the counter device increments from 0 to 3 every rising edge of the first clock signal 220, and the hardware module 120 generates a second clock signal 225 and a third clock signal 240 based on the incremented value of the counter device. By performing a logical exclusive OR operation between the second clock signal 225 and the third clock signal 240 based on the incremented value of the counter device, the hardware module 120 generates a pulse width modified clock pulse 282 which narrows a clock pulse width of a third clock signal 240.

A choice of which edge to preserve (i.e., rising edge sensitive or falling edge sensitive) is independent of a choice of narrowing, removing or widening a clock pulse within a clock period in a clock signal.

Figure 4:
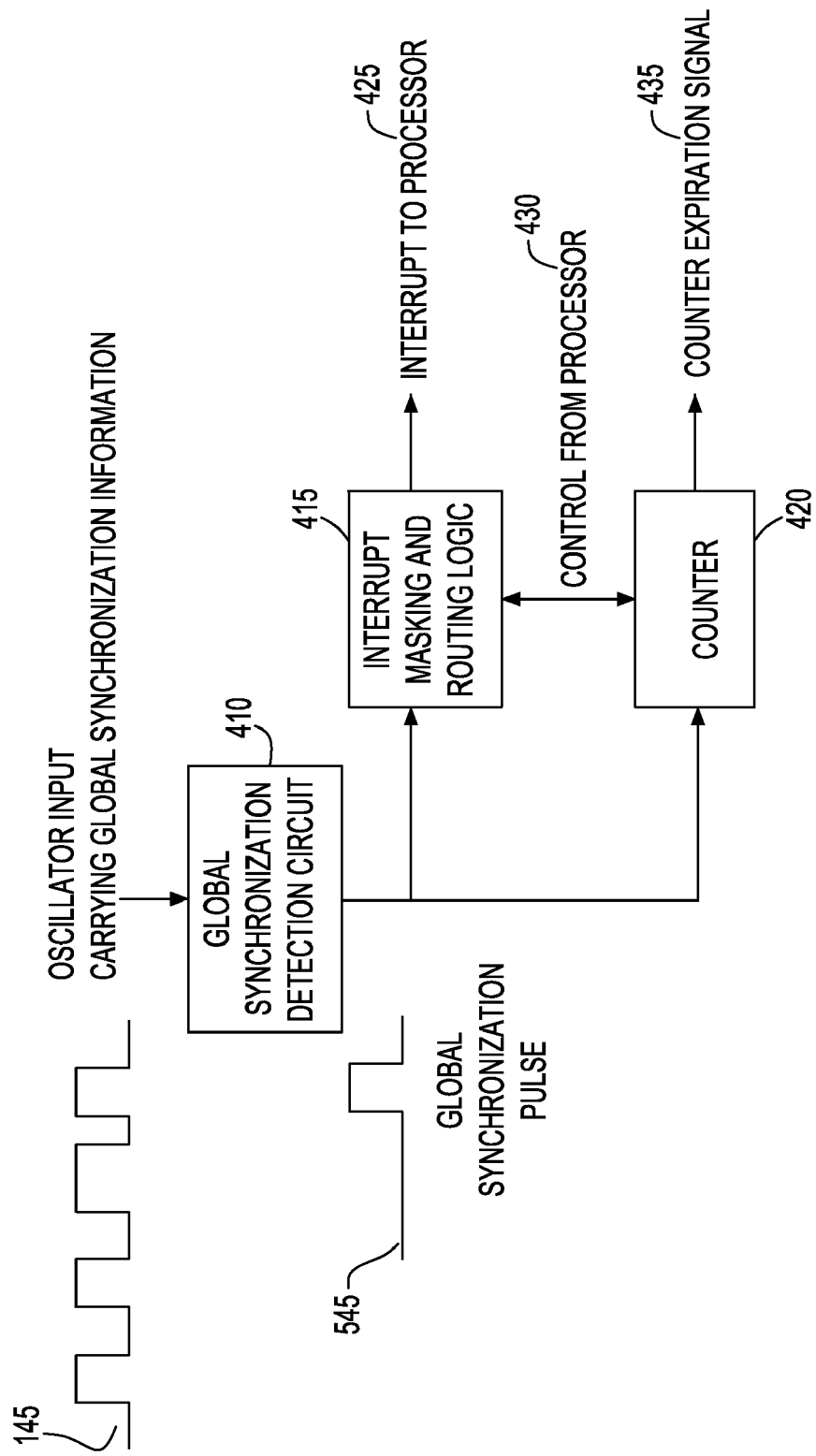
FIG. 4 illustrates detecting of a global synchronization signal in one embodiment.
Figure 5:
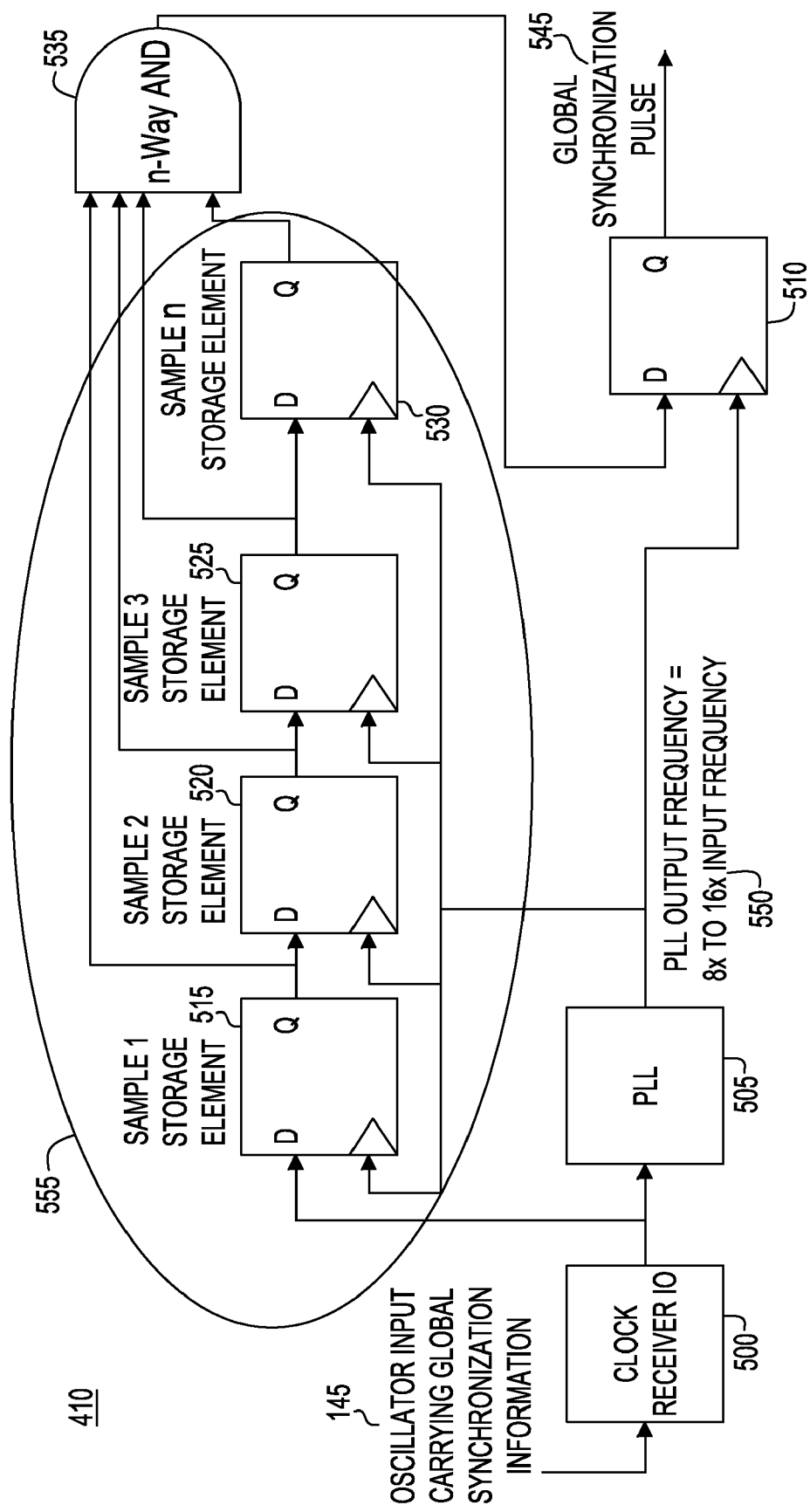
FIG. 5 illustrates a system diagram for detecting a pulse width modification and outputting a global synchronization signal in one embodiment.

FIG. 4 illustrates a system diagram for detecting a pulse width modified clock signal 145 (e.g., a signal 215 or signal 245 in FIGS. 2a-2b) and generating a global synchronization pulse signal 545 in one embodiment. A detection circuit 410 detects the pulse width modified clock signal 145 and generates the global synchronization pulse signal 545. FIG. 5 illustrates a system diagram of the detection circuit 410 in one embodiment. The circuit 410 may include, but is not limited to an input buffer 500, a PLL (Phase Locked Loop) or DLL (Delay Locked Loop) 505, a series of latches 555 comprising a plurality of flip flops (e.g., flip flops 515, 520, 525, and 530), a logical AND gate 535 receiving a plurality of inputs (i.e., an output of the latches 555) and a flip flop 510 (e.g., D flip flop).

Upon receiving the pulse width modified clock signal 145, the input buffer 500 (e.g., a plurality of inverters) strengthens the pulse width modified clock signal, e.g., by increasing magnitude of the pulse width modified clock signal 145. The input buffer 500 provides the strengthened clock signal to the PLL or DLL or the like 505 and to the latches 555. The PLL or DLL 505 filters the strengthened clock signal and increases a clock frequency of the filtered clock signal (e.g., generates a clock signal which is 8 times or 16 times faster than the pulse width modified clock signal 145). The PLL and/or DLL and/or the latches 555 may be used for oversampling according to any other sampling rate. The PLL or DLL or the like 505 provides the filter clock signal having the increased clock frequency to the latches 555 and the flip flop 510 for their clocking signals. The latches 555 also receive the strengthened clock signal from the input buffer 500, detect a clock pulse having a modification in the strengthened clock signal, and generate a global synchronization signal as shown in FIG. 3. The PLL or DLL or the like 505 can be a rising edge sensitive or falling edge sensitive.

FIG. 3 illustrates an example for detecting a modified clock pulse in a pulse width modified clock signal and generating a global synchronization signal in one embodiment. Upon receiving a pulse width modified clock signal 345, a user determines jitter of the signal 345, e.g., by running the PLL or DLL 505. For example, the user may determine that there is jitter 300 in the signal 145 after running PLL or DLL 505. Crandford, Jr., et al., "Method and apparatus for determining jitter and pulse width from clock signal comparisons," U.S. Pat. No. 7,286,947, wholly incorporated by reference as if set forth herein, describes a method for determining jitter in a clock signal. Upon determining jitter in the signal 345, a user determines a sampling rate for the signal 345. For example, if there is less than 7% jitter in the signal 345 and a clock frequency of the signal 345 is 100 MHz, the sampling rate may be 800 MHz or 1600 MHz to distinguish a clock pulse affected by the jitter and a clock pulse modified by the hardware module 120. This sampling performed at a higher frequency than the signal 345 is referred to herein as oversampling.

The latches 555 perform this oversampling along with an oversampling frequency obtained from the PLL or DLL or the like 505. The latches 555 increase a sampling rate, e.g., by increasing the number of flip flops in it. The latches 555 decrease a sampling rate, e.g., by decreasing the number of flip flops in it. For example, as shown in FIG. 3, if latches 555 sample the signal 345 at 8 times faster frequency than the signal 345, there are 8 samples per a clock period. If there is no modified clock pulse within a clock period in the signal 345, there may be an equal number of samples with the signal 345 at a high level ("1") and at a low level ("0"). A sequence 310 of samples shows samples sampled at an 8 times faster frequency than the signal 345. A sequence 315 of samples shows samples sampled at a 16 times faster frequency than the signal 345. If a clock period 355 in the signal 345 does not have a modified clock pulse, the clock period 355 might have a falling clock edge at a timing 320 and might have same number of samples of the signal 345 at high and low. However, since the clock period 355 had a modified clock pulse, there are five samples of the clock period 355 at high and there are three samples of the clock period 355 at low. In one embodiment, the latches 555 and the AND gate 535 generates a global synchronization signal (e.g., a global synchronization signal 545 in FIG. 4) whose pulse width is the same as modified pulse width. For example, in FIG. 3, the global synchronization signal may have a pulse whose width is the difference between a sample 350 and a sample 340. In another embodiment, the latches 555 and the AND gate 535 generate a global synchronization signal whose pulse width is larger or smaller than the modified pulse width. The number of inputs to the AND gate 535 may determine the number of samples to be positive to trigger the global synchronization signal 545.

In one embodiment, the detection circuit 410 detects a widened clock pulse, e.g., as the latches 555 receive "1"s which are extended to, for example, an extra quarter clock cycle. In other words, if the latches 555 receive more "1"s than "0"s within a clock period, the detection circuit 410 detects a widened clock pulse. In one embodiment, the detection circuit 410 detects a narrowed clock pulse, e.g., as the latches 555 receive "0"s which are extended to, for example, an extra quarter clock cycle. In other words, if the latches 555 receive more "0"s than "1"s within a clock period, the detection circuit 410 detects a narrowed clock pulse.

In one embodiment, a parallel computing system is implemented in a semiconductor chip (not shown) that includes a plurality of processors. There is at least one clock generation circuit 100 and at least one detection circuit 410 in the chip. These processors detect a pulse width modified clock signal, e.g., via the detection circuit 410.

Returning to FIG. 5, the latches 555 and the AND gate 535 provide the generated global synchronization signal to the flip flop 510 to align the generated global synchronization signal with the strengthened clock signal (i.e., an output signal of the input buffer 500) or the filtered clock signal having the increased clock frequency (i.e., an output signal of the PLL or DLL 505). Then, the flip flop 510 outputs the aligned global synchronization signal to a logic 415 and/or a counter 420 as shown in FIG. 4. The logic 415 masks (i.e., ignores) the aligned global synchronization signal or fires an interrupt signal 425 to processors in response to the aligned global synchronization signal.

The counter 420 delays a response to the aligned global synchronization signal, e.g., by forwarding the aligned global synchronization signal to processors when a value of the counter becomes a zero or a threshold value. In one embodiment, the counter 420 can be programmed in a different or same way across semiconductor chips implementing parallel computing systems. The processor(s) controls the logic 415 and/or the counter 420. In one embodiment, a pulse width modification occurs repetitively. The global synchronization signal 545 comes into the counter 420 at a regular rate. By programming the counter 420 that decrements or increments on every pulse on the global synchronization signal 545, issuing an interrupt signal 425 or the like to processors can be delayed until a value of the counter 420 reaches zero or a threshold value. In other words, an action (e.g., interrupt 425) to processors can be delayed for a predetermined time period, e.g., by configuring the value of the counter 420.

In one embodiment, if a control (e.g., an instruction) from a processor writes a number "N" into the counter 420, the counter 420 may start decrementing on a receipt of every subsequent global synchronization signal. Once the counter 420 expires (i.e. has decremented to 0), the counter 420 generates a counter expiration signal 435, that a subsequent logic can use for whatever purpose. For example, a purpose of the counter expiration signal is to trigger for a series of subsequent counters that provide a sequence for waking up the chip (i.e., a semiconductor chip having a plurality of processors) from a reset state.

The following describes an exemplary protocol that can be applied in FIG. 4: (A semiconductor chip may have a plurality of processors. "gsync" interrupt refers to an interrupt signal (e.g., the interrupt signal 425 in FIG. 4) caused by a global synchronization signal 545. "gsync signal" refers to a global synchronization signal 545.)

0. All semiconductor chips in a partition start with having a gsync interrupt masked (i.e. incoming gsync signals are ignored).
1. A single semiconductor chip in the partition (which can span from a single chip to all chips in a machine, e.g., IBM® Blue Gene L/P/Q) takes a lead role. This single semiconductor chip is referred herein to a "director" chip.
2. Software on the director chip clears any pending a gsync interrupt state (i.e., a state caused by the gsync interrupt) and then unmasks the gsync interrupt.
3. A next incoming gsync signal may thus trigger a gsync interrupt.
4. After taking this interrupt, the director chip waits for an appropriate delay and then communicates to all semiconductor chips in the partition to take the next gsync interrupt.
5. All semiconductor chips (including the director chip) clear any pending gsync interrupt and then unmask the gsync interrupt.
6. A next incoming gsync signal may thus trigger a gsync interrupt on all the chips.
7. All the chips wait an appropriate delay and then write the counter 420 with a suitable number "N".
8. All the chips quiesce and go into reset in order to achieve a reproducible state.
9. If necessary, an external control system can even step in and take a step to achieve the reproducible state.
10. Upon an expiration of the counter 420, i.e., when a value of the counter 420 becomes zero, all the chips start a deterministic wake-up sequence that is run synchronously.

All the chips may therefore be in a deterministic phase relationship with each other.

The "appropriate delay" in step 4 is intended to overcome jitter that is incurred between semiconductor chips in the machine. This delay represents an uncertainty in timing due to a chip-to-chip communication having a different distribution path from a (global) oscillating signal distribution path to each semiconductor chip.

If a gsync signal occurs with a period, for example, on a millisecond scale, and a corresponding jitter band across the machine (e.g., the worst uncertainty case in a gsync signal distribution+the worst latency case of a chip-to-chip communication) is, for example, 10s of microseconds, then it is sufficient for the director chip(s) to wait, e.g. 100 microseconds after its gsync signal from step 3 to ensure that all chips in the partition will be safely ignore an initial noise signal, and may be ready to the chip-to-chip communication of step 4 and to the step 5 before the next gsync signal (of step 6) arrives. This next gsync signal is indeed the same gsync signal for all the chips.

The "appropriate delay" in step 7 is to ensure that the counter 420 is programmed once a current gsync signal (of step 6) is detected, so that decrementing a value of the counter 420 starts only on a subsequent gsync signal. However, depending on an implementation of the machine, this delay in step 7 may not be necessary, i.e. can be zero.

The "suitable number N" of step 7 may safely cover the reset state of steps 8 and 9, including any time span that may need to be incurred to give the external control system an opportunity to step in.

In one embodiment, the clock generation circuit 100 preserves rising edges of the oscillating signal so that on-chip PLLs (e.g., PLL 505 in FIG. 5) that may be sensitive to a rising edge positioning are unaffected by a particular implementation of the pulse width modulation, which can affect a positioning of falling edges.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which when loaded in a computer system is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more of functions of this invention. The present invention may also include a computer program product for one or more functions of this invention. The computer program product includes a storage medium (e.g., a disk, optical disc, memory device, solid-state drive, etc.) readable by a processing circuit and storing instructions run by the processing circuit for performing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for synchronizing a plurality of processors in a parallel computing system, the method comprising:
   generating a clock signal;
   performing a pulse width modification on the clock signal, the pulse width modification changing a pulse width within a clock period in the clock signal;
   distributing the pulse width modified clock signal to a plurality of processors in the parallel computing system to synchronize the processors;
   receiving, at one or more detection circuit associated with the processors, the distributed pulse width modified clock signal;
   oversampling the received pulse width modified clock signal; and
   generating a synchronization signal based on the oversampling, the generated synchronization signal used to synchronize the processors.

2. The method according to claim 1, further comprising:
   resetting the parallel computing system in response to the pulse width modified clock signal.

3. The method according to claim 1, further comprising:
   removing a jitter in the pulse width modified clock signal.

4. The method according to claim 1, wherein the pulse width modification comprises one or more of:
   removing a pulse within the clock period in the clock signal;
   narrowing a pulse width within the clock period in the clock signal; and
   widening a pulse width within the clock period in the clock signal.

5. The method according to claim 4, wherein the narrowing includes a logical exclusive-OR operation.

6. The method according to claim 4, wherein the widening includes a logical OR operation.

7. The method according to claim 4, wherein the removing includes a logical exclusive OR operation.

8. The method according to claim 7, further comprising:
   detecting the pulse width modified clock signal.

9. The method according to claim 1, wherein the oversampling comprises:
   increasing a clock frequency of the pulse width modified clock signal.

10. The method according to claim 1, wherein the synchronization signal interrupts the processors in the parallel computing system.

11. An apparatus for synchronizing a plurality of processors in a parallel computing system, the apparatus comprising:
    a hardware module for generating a clock signal and for performing a pulse width modification on the clock signal, the pulse width modification changing a pulse width within a clock period in third clock signal;
    a clock splitter for distributing the pulse width modified clock signal to a plurality of processors in the parallel computing system to synchronize the processors;
    one or more detection circuit, associated with the processors, for receiving the pulse width modified clock signal;
    a plurality of flip flops, in the one or more detection circuit, for oversampling the pulse width modified clock signal;
    a hardware logic gate, in the one or more detection circuit, for generating a synchronization signal based on the oversampling, the generated synchronization signal used to synchronize the processors.

12. The apparatus according to claim 11, further comprising:
    a flip flop for removing a jitter in the pulse width modified clock signal.

13. The apparatus according to claim 11, wherein the pulse width modification comprises one or more of:
    removing a pulse within the clock period in the clock signal;
    narrowing a pulse width within the clock period in the clock signal; and
    widening a pulse width within the clock period in the clock signal.

14. The apparatus according to claim 13, wherein a logical exclusive OR gate performs the narrowing.

15. The apparatus according to claim 13, wherein a logical OR gate performs the widening.

16. The apparatus according to claim 13, wherein a logical exclusive OR gate performs the removing.

17. The apparatus according to claim 11, further comprising:
a phase locked loop or delay locked loop for increasing a clock frequency of the pulse width modified clock signal.

18. The apparatus according to claim 11, wherein the hardware logic gate comprises a logical AND gate and a flip flop.

19. The apparatus according to claim 11, wherein the synchronization signal interrupts the processors in the parallel computing system.

20. The apparatus according to claim 11, further comprising:
a counter device for dividing a clock frequency of the generated clock signal.

21. A computer program product for synchronizing a plurality of processors in a parallel computing system, the computer program product comprising a non-transitory storage medium readable by a processing circuit and storing instructions run by the processing circuit for performing steps of:
generating a clock signal;
performing a pulse width modification on the clock signal, the pulse width modification changing a pulse width within a clock period in the clock signal;
distributing the pulse width modified clock signal to a plurality of processors in the parallel computing system to synchronize the processors;
receiving, at one or more detection circuit associated with the processors, the distributed pulse width modified clock signal;
oversampling the received pulse width modified clock signal; and
generating a synchronization signal based on the oversampling, the generated synchronization signal used to synchronize the processors.

* * * * *